Jan. 15, 1935. W. P. SCHMITTER ET AL 1,988,338
GEARED ELECTRIC MOTOR
Filed April 13, 1932 2 Sheets-Sheet 1

Inventor
Walter P. Schmitter
Ralph Wiken
Ralph W. Brown Attorney

Jan. 15, 1935.  W. P. SCHMITTER ET AL  1,988,338
GEARED ELECTRIC MOTOR
Filed April 13, 1932  2 Sheets-Sheet 2

Inventor
Walter P. Schmitter
Ralph Wiken
Ralph Brown
Attorney

Patented Jan. 15, 1935

1,988,338

UNITED STATES PATENT OFFICE 1,988,338

GEARED ELECTRIC MOTOR

Walter P. Schmitter and Ralph Wiken, Milwaukee, Wis., assignors to The Falk Corporation, Milwaukee, Wis., a corporation of Wisconsin Application April 13, 1932, Serial No. 605,002

1 Claim. (Cl. 74—421)

This invention relates to geared electric motors.

A general aim of the present invention is to combine a speed reducer of the herringbone gear type with an electric motor in such manner as to provide a quiet running, compact, self contained driving unit of high efficiency, wherein the power developed at relatively high motor speeds is rendered available at greatly reduced speeds.

Such a driving unit, constructed in accordance with the present invention, may be advantageously employed as a substitute for the larger, more expensive, slow speed motor of like horsepower at a substantial saving in first cost and in operating space requirements.

For purposes of structural and consequent manufacturing economies the driving pinion, in a unit of the character mentioned, is carried directly by the motor armature shaft and meshes with one of the gears of the speed reduction gear set, the latter being enclosed and supported by a housing removably fixed concentrically of the motor frame. The housing and frame are ordinarily assembled by a relative axial movement thereof into interlocking relation, the interlock being such as to positively retain the parts against radial displacement and thereby assure proper meshing relation between the driving pinion and its mating gear.

A more specific object of the present invention is to make possible the use of herringbone gears in a unit of the character mentioned by an improved design which will permit intermeshing of the driving pinion with its mating gear by a relative radial movement without impairing the centering function of the above mentioned interlock between the gear housing and motor frame.

Other specific objects and advantages will appear from the following description of two illustrative embodiments of the present invention.

In the accompanying drawings:—

Figure 1:
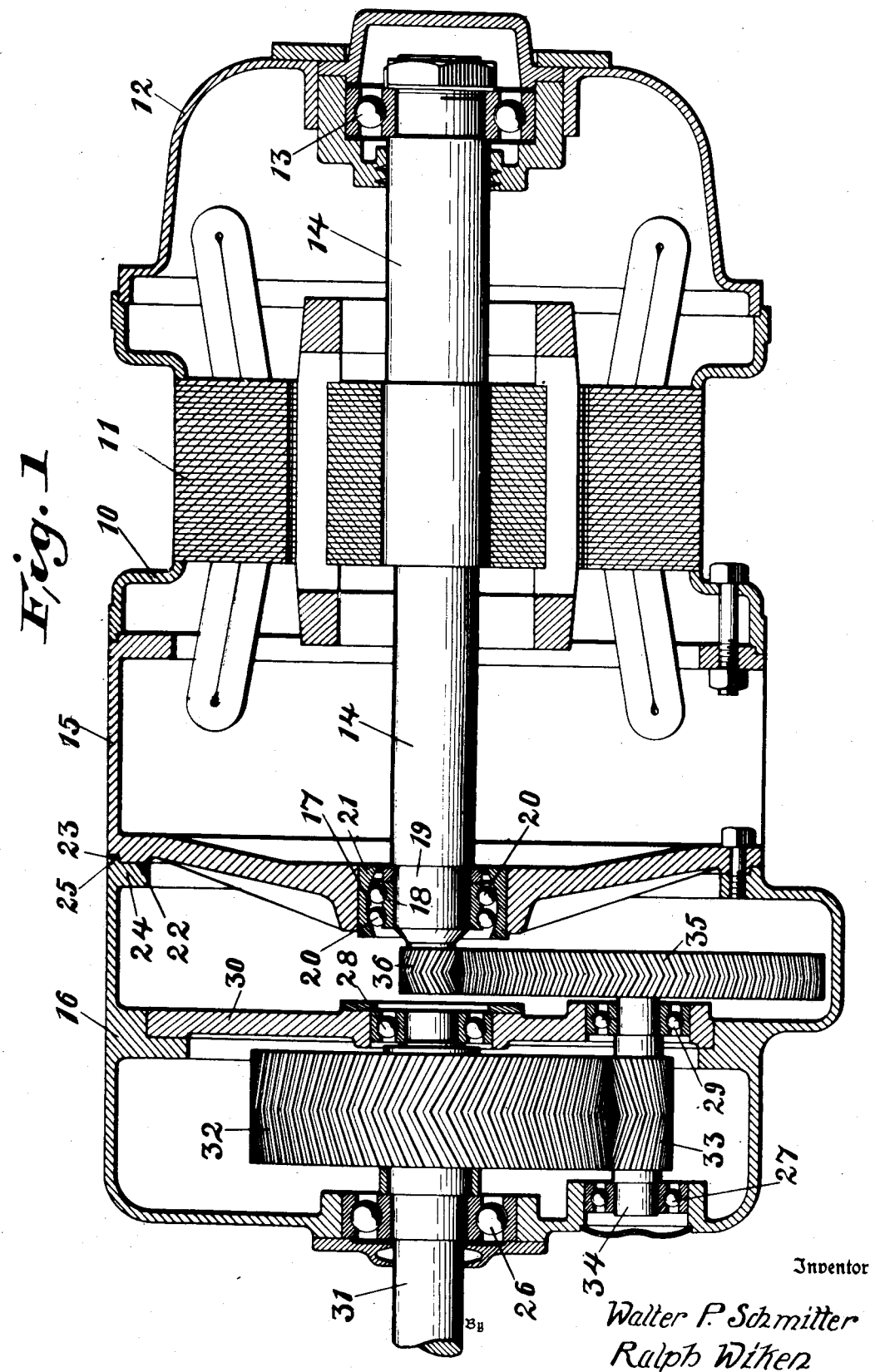
Figure 1 is a longitudinal sectional view of a geared type motor constructed in accordance with the present invention.

The geared motor shown in Fig. 1 includes a standard type of electric motor having a conventional stator frame 10 and core 11, and provided with the usual end head 12 equipped with an anti-friction bearing 13 for one end of the armature shaft 14. The other end head 15 is designed to receive the gear housing 16 and is equipped with a swivel type anti-friction bearing 17 for the other end of shaft 14.

Figure 2:
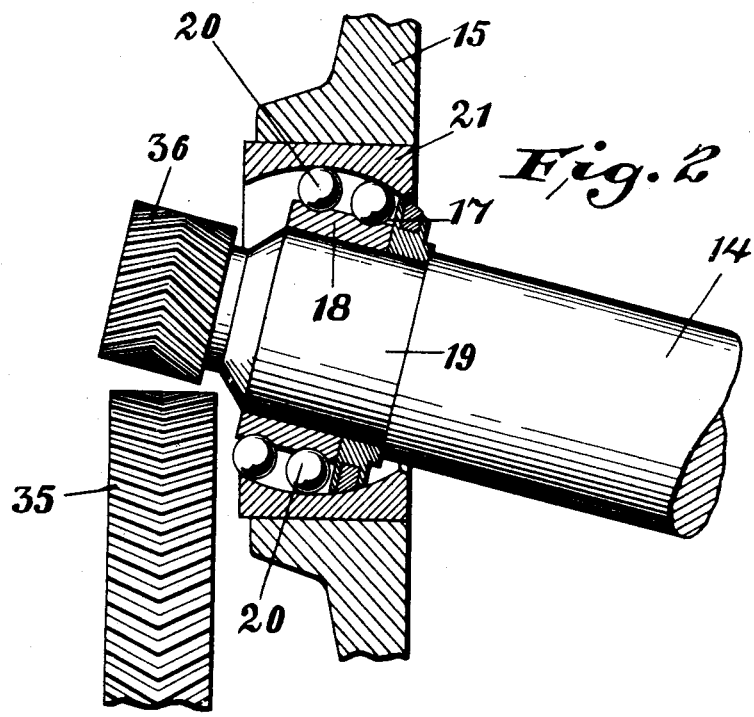
Fig. 2 is a fragmentary view on a larger scale of the driving pinion and its mating gear, illustrating the method of assembling the same.

The bearing 17 comprises an inner race ring 18 fitted loosely on the reduced end 19 of the shaft and grooved to receive the two sets of balls 20, which coact with the inner spherical surface of an outer race ring 21 in such manner as to permit the shaft to be canted, as indicated in Fig. 2.

In addition to its shaft supporting function the end head 15 also serves as a closure for the gear housing 16 and as a means for positively centering the same with respect to the motor axis. In this instance the end head 15 is machined to provide an upstanding annular bearing face 22, with a peripheral shoulder 23, adapted to seat against an inturned flange 24 on the housing with the shoulder 23 closely fitted within a peripheral centering ring 25 thereon. The ring 25 and shoulder 23 thus provide an interlocking telescopic connection which positively retains the housing against lateral displacement.

The outer end of the housing 16 is in this instance permanently closed and equipped with two anti-friction bearings 26 and 27, which are aligned with similar bearings 28 and 29, respectively, provided in a removable partition 30. Bearings 26 and 28 support the low speed shaft 31, which is preferably aligned with the armature shaft 14 and projects outwardly from the housing. The shaft 31 carries a herringbone gear 32 which meshes with and is driven by a herringbone pinion 33 on a countershaft 34, supported in the bearings 27—29. The shaft 34 also carries a herringbone gear 35, through which it is driven, the gear 35 meshing with and driven by a herringbone pinion 36 carried by the projecting end of the armature shaft 14.

It will be noted that the gear train just described provides a double speed reduction between the shafts 14 and 31 which is capable of affording a total gear ratio as high as seventy to one therebetween. A relatively small high speed motor is thus rendered available for use in industrial applications requiring relatively low speed operation.

It will also be noted that the unit is quite compact, the entire length therefore being only approximately one third greater than the length of the motor alone.

In assembling the unit, the gears 32, 33 and 35 and their supporting shafts 31 and 34, together with the partition 30, are first assembled within the housing 16. Then, after the end head 15 has been applied to the housing 16 with the bearing face 22 and shoulder 23 within the centering flange 25, the reduced end 19 of the armature shaft, with its pinion 36, is projected through the swivel bearing 17, the armature shaft being canted, as indicated in Fig. 2, so as to permit the pinion 36 to clear the gear 35. The armature shaft is thereafter swung into proper position of alignment so as to mesh pinion 36 with gear 35, and the stator frame 10 and end head 12 are finally applied to the head 15 with the outer end of the armature shaft supported in the bearings 13.

Figure 3:
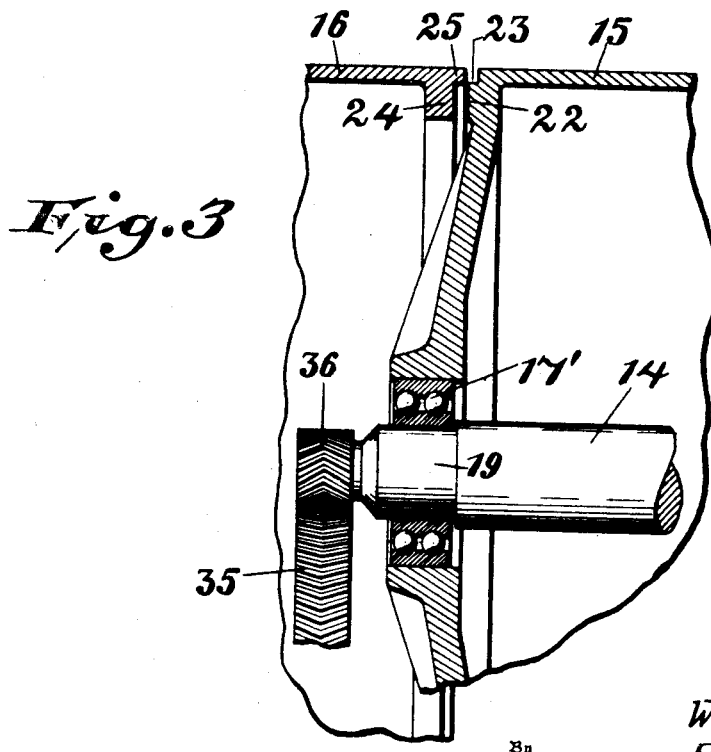
Fig. 3 is a fragmentary sectional view of a part of a geared motor illustrating a slightly modified construction permitting a somewhat different mode of assembly.

In the modified construction illustrated in Fig. 3 the motor, with its end head 15, and the speed reduction gear set, with its casing 16 are substantially identical with the corresponding parts shown in Fig. 1, the head 15 having a circular shoulder adapted to seat within a centering flange 25 on the casing 16. In this instance however the swivel bearing hereinabove described has been replaced by a plain anti-friction bearing 17', and the reduced portion 19 of the armature shaft 14 has been somewhat extended so as to permit the armature shaft 14 to be projected through the bearing 17' to a position somewhat beyond its normal working position.

With the parts thus arranged, assembly of the gear set and motor may be effected in the following manner. After the gear set has been completely assembled within the housing 16, and after the motor parts have been completely assembled, with the head 15 attached to the motor frame 10, the armature shaft 14 is projected toward the left (Fig. 3) until the pinion 36 is disposed somewhat beyond its normal working position. With the pinion 36 thus projected, it may be shifted laterally into mesh with the gear 35 by suitable manipulation of the motor frame and attached head 15, before engaging the shoulder 23 within the centering ring 25. Thereafter the motor and head 15 may be shifted axially so as to project the shoulder 23 into the ring 25, the free lengthwise movement of the shaft 14 relative to the motor frame permitting this final adjustment of the motor frame without disturbing the then established intermeshed relation between the pinion 36 and gear 35.

In the arrangement last described, the assembly of parts is made possible by reason of the freedom of movement of the shaft 14 axially of the motor frame, although it will be apparent to those skilled in the art that a similar result may be effected by permitting axial movement of the gears and shafting within the gear housing 16.

Various other changes may be made in the embodiments of the invention hereinabove specifically described without departing from or sacrificing the advantages of the invention as defined in the appended claim.

We claim:—

In a device of the character described the combination of an electric motor having a housing and an armature shaft therein, a gear housing axially movable into interlocking engagement with said motor housing, a speed reduction gear set in said gear housing including a herringbone gear, a herringbone gear on said armature shaft disposed to mesh with said first named gear when said housings are engaged, and a swivel bearing for said shaft permitting said shaft and its gear to be rocked to facilitate assembly of said housings and gears.

WALTER P. SCHMITTER.
RALPH WIKEN.